United States Patent [19]

Haldric et al.

[11] Patent Number: 4,730,508

[45] Date of Patent: Mar. 15, 1988

[54] SEPARABLE CONNECTING DEVICE, IN PARTICULAR FOR THE STEERING COLUMN OF A MOTOR VEHICLE

[75] Inventors: Bernard Haldric; Grégorio Benedi; Sylvie Baudon née Chardon, all of Vendome, France

[73] Assignee: NACAM, Vendome, France

[21] Appl. No.: 862,800

[22] Filed: May 13, 1986

[30] Foreign Application Priority Data

May 23, 1985 [FR] France ............... 85 07792

[51] Int. Cl.[4] ............................................. B62D 1/18
[52] U.S. Cl. ........................................ 74/492; 280/777
[58] Field of Search ............... 74/492; 403/206, 216, 403/389; 280/777

[56] References Cited

U.S. PATENT DOCUMENTS

| | | | |
|---|---|---|---|
| 3,468,183 | 9/1969 | Schwartzberg | 74/492 |
| 3,567,246 | 3/1971 | Wilfert et al. | 74/492 |
| 3,752,007 | 8/1973 | Blondeleau et al. | 74/492 |
| 3,760,649 | 9/1973 | Decouzon et al. | |
| 3,960,031 | 6/1976 | Chometon et al. | 74/492 |
| 4,133,220 | 1/1979 | Wenninger | 74/492 |
| 4,156,372 | 3/1979 | Wenninger | 74/492 |
| 4,504,164 | 3/1985 | Bien | 74/492 |
| 4,535,645 | 8/1985 | Di Bisschop et al. | 74/494 |
| 4,572,022 | 2/1986 | Mettler | 74/492 |

FOREIGN PATENT DOCUMENTS

| | | |
|---|---|---|
| 1927173 | 12/1970 | Fed. Rep. of Germany . |
| 2737001 | 3/1979 | Fed. Rep. of Germany ........ 74/492 |
| 1572812 | 6/1969 | France . |
| 2118275 | 7/1972 | France . |
| 1174540 | 12/1969 | United Kingdom . |

*Primary Examiner*—Andrew V. Kundrat
*Assistant Examiner*—Peter M. Cuomo
*Attorney, Agent, or Firm*—Wenderoth, Lind & Ponack

[57] ABSTRACT

A separable connecting device, in particular of a steering column for a motor vehicle, includes two shaft sections having end portions which overlap and each carrying a flange. The flanges are interconnected by connecting pins whcih are separable in the event of impact. The flanges carried by each shaft section are of identical shape, and the connecting pins are fixed to each flange and are slidably engaged in openings provided in the other flange.

18 Claims, 3 Drawing Figures

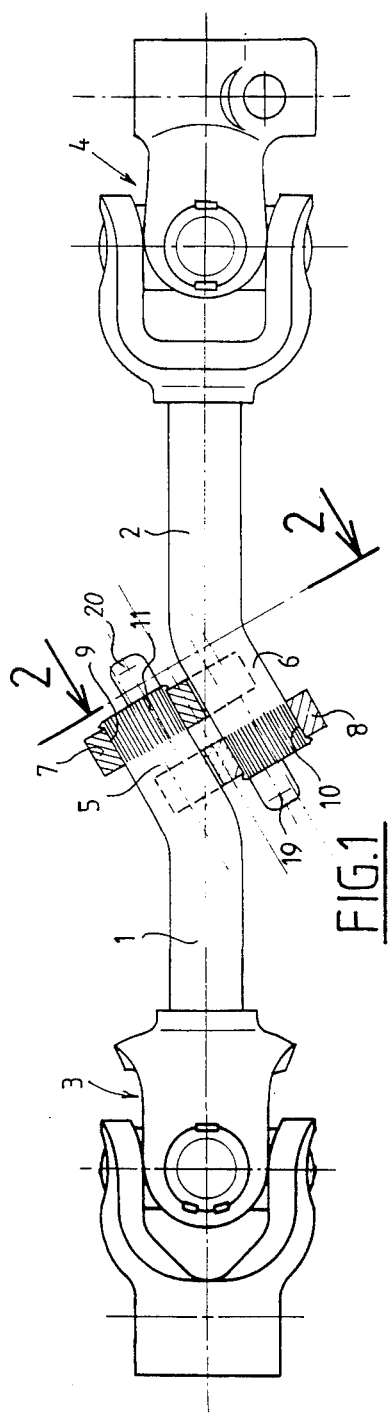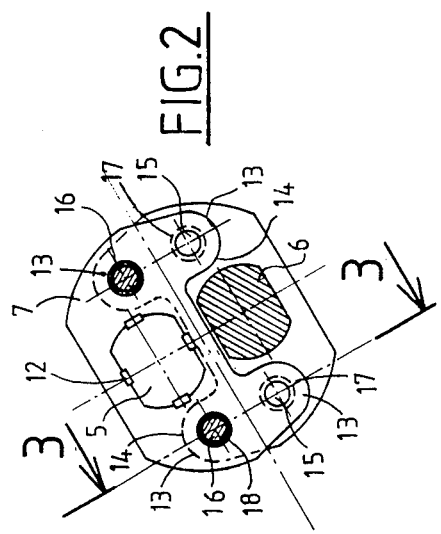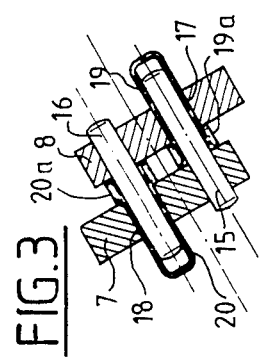

4,730,508

SEPARABLE CONNECTING DEVICE, IN PARTICULAR FOR THE STEERING COLUMN OF A MOTOR VEHICLE

BACKGROUND OF THE INVENTION

The present invention relates to steering columns and more particular to steering columns for motor vehicles which are separable in the event of impact.

When a motor vehicle is subjected to a front impact, the steering wheel carried by the steering column has a tendency to be displaced in the passenger compartment of the vehicle toward the driver.

In order to avoid this displacement of the steering wheel which is dangerous for the driver, various arrangements have been proposed.

For this purpose, steering columns have been constructed in which a part is formed by a corrugated tube capable of being deformed under the effect of an impact by compression of the corrugations.

The drawbacks of such an arrangement is that it has an appreciable residual length, even when the corrugations of the tube have been compressed to the extent of becoming adjoining.

An attempt has also been made to employ telescopic devices comprising a shaft movable in a tube, the retraction force being obtained by the friction of the shaft in the tube either directly by metal-to-metal contact or through an insert of plastics material interposed between the shaft and the tube.

The telescopic device also has the drawback of having a residual length equal to the length of the tube when the shaft is completely engaged in the latter.

It has also been thought of to employ a steering column having a part which is deformable under the effect of impact from the front.

In this arrangement, there is a problem of residual length of the column which allows a certain risk of rearward movement of the steering wheel.

It has also been proposed to render the steering column separable in the event of impact.

For this purpose, two sections of a steering column have been connected by two flanges each carried by a section and interconnected by two shafts rendered integral with one of the flanges and axially slidably mounted in orifices provided in the other flange.

SUMMARY OF THE INVENTION

An object of the invention is to improve steering columns which are separable under the effect of impact by providing a column of this type in which the component parts providing the separable connection of two sections of the steering column are easier to construct and have a reduced overall size.

The invention therefore provides a separable connecting device between two shaft sections, in particular of a steering column for a motor vehicle, said shaft sections having end portions which overlap and each carrying a flange, said flanges being interconnected by connecting pins which are separable in the event of impact, wherein said flanges carried by each shaft section are of identical shape and the connecting pins are fixed to each flange and slidably engaged in openings provided in the other flange.

BRIEF DESCRIPTION OF THE DRAWINGS

A better understanding of the invention will be had from the following description which is given solely by way of example with reference to the accompanying drawings, in which:

FIG. 1 is an elevational view of a portion of a steering column which is separable in the event of impact according to the invention;

FIG. 2 is a sectional view taken on line 2—2 of FIG. 1, and,

FIG. 3 is a sectional view taken on line 3—3 of FIG. 2.

DETAILED DESCRIPTION OF THE INVENTION

FIG. 1 shows an intermediate portion of a steering column comprising two shaft sections 1, 2 each of which is secured to a corresponding universal joint 3, 4 for connection to the rest of the steering column.

Each shaft section 1, 2 has an end portion 5, 6 opposed to the corresponding universal joint 3, 4 and which is bent in such manner as to make a predetermined angle with the general axis of the considered portion of the steering column.

The end portions 5, 6 overlap and each carry a flange 7, 8 which is fixed to the corresponding end portion by means of an opening 9, 10 formed in each flange.

The openings 9, 10 have a shape complementary to that of the end portions 5, 6 engaged therein.

End portions 5, 6 advantageously include splined surfaces 11 and the flanges 7, 8 are secured to the end portions by a hammering over of the end of the shaft, as shown at 12 in FIG. 2.

Each flange 7, 8 has two lateral projections 13 which define therebetween a cavity 14 for the passage of the end portion to which the other flange is secured.

Fixed in each projecting portion 13 of each flange 7, 8, for example by a setting or forming over operation, are connnecting pins 15, 16. These connecting pins are axially slidably engaged in openings 17, 18 provided in the other flange.

The connecting pins 15, 16 are mounted in the corresponding openings 17, 18 through sleeves 19, 20 of friction material, for example of rigid plastics material, each provided with a shouldered flange 19a, 20a forming a spacer element for defining the distance between the flanges 7, 8 in the assembled position thereof.

The flanges 7 and 8 have an identical shape and are mounted in a configuration which is symmetrical with respect to the axis of the considered steering column portion. The four connecting pins 15, 16 are advantageously of small diameter so that they are rendered deformable in order to to avoid sudden breakages.

The assembly thus formed permits achieving a rigid maintenance of the shaft sections 1, 2 and transmitting the steering torque.

If it is desired that the connecting device constitute an articulation allowing small angular displacements of the shaft sections with respect to each other, the sleeves 19, 20 may be made from a suitable elastomer.

In the event of impact creating a compressive force on the steering column, the flanges 7, 8 are subjected, through the shaft sections 1, 2, to a force which tends to separate them.

The sleeves 19, 20 of plastics material ensure on the connecting shafts or pins 15, 16 a gripping which permits a controlled sliding force of the connecting pins.

The flanges 7, 8 are therefore displaced beyond a force threshold and the displacement is ensured with a controlled force.

When the connecting pins 15, 16 are completely disengaged from the openings 17, 18 of the flanges in which they are normally engaged, the two shaft sections 1, 2 are released from each other.

The steering column may therefore undergo a shortening which may be as much as resulting in the contact between the universal joints 3, 4.

If the vehicle body elements so allow, the relative displacement may even be greater.

The system just described is of simple design.

Owing to its symmetrical configuration, it employs identical component parts associated with each shaft section and thus reduces the manufacturing cost of the assembly.

It is also of reduced overall size as compared to known systems of this type.

The reduction in the overall size is moreover due to the use of a large number of connecting pins 15, 16 of relatively small diameter, disposed symmetrically with respect to the general axis of the considered steering column section.

In the embodiment just described, the end portions of each shaft section make an angle with the general axis of the steering column portion. Consequently, the flanges 7, 8 carried by each section are disposed obliquely relative to the axis of the steering column, and the same is true of the separating force produced in the event of impact, which still further facilitates the separation of the shaft sections.

It may also be envisaged to employ the same assembly for assembling shaft sections at least one of which has an end portion which is bent in such manner as to be parallel to the shaft section of which it is a part. The other shaft section may then be rectilinear or have an end portion which is bent in the same way.

The rigidity of the connection provided by the flanges and the connecting pins, when the latter are mounted in the flanges through sleeves of rigid plastics material, permits disposing this assembly in any region of the steering column, and in particular between two universal joints.

What is claimed is:

1. A separable connecting device between two shaft sections which have a common axis and which include end portions that are offset with respect to said common axis and that are in overlapping relation to each other, said device comprising two flanges of identical configuration, each said flange having fixed to and extending therefrom respective connecting pins and defining respective openings complementary to said pins, each said flange being fixed to a respective said end portion with said flanges being mounted symmetrically in such manner that said connecting pins of each of said flanges extend slidably through said openings of the other of said flanges, and sleeves of friction material interposed between said connecting pins fixed to each of said flanges and the respective said openings provided in the other of said flanges, said sleeves forming means to provide gripping to ensure controlled sliding between said connecting pins and said respective openings.

2. A connecting device according to claim 1, wherein at least one of said offset end portions is inclined relative to said common axis, and said flanges are secured to said end portions in such manner as to be disposed obliquely relative to said common axis.

3. A connecting device according to claim 1, wherein said sleeves are made from a rigid plastics material.

4. A connecting device according to claim 1, wherein said sleeves are made from an elastomer.

5. A connecting device according to claim 1, wherein at least one said end portion is bent so as to be parallel to the respective said shaft section of which it is part.

6. A connecting device according to claim 1, wherein each said flange has extending therethrough a further opening in which is engaged the respective said end portion of the corresponding shaft section, and each said flange includes two lateral projecting portions which define therebetween a cavity for the passage of the said end portion to which the other said flange is secured.

7. A connecting device according to claim 6, wherein said connecting pins of each said flange are each fixed to one of said lateral projecting portions of said each flange.

8. A connecting device according to claim 1, wherein at least one of said flanges is mounted in an inclined position relative to the respective said end portion to which it is fixed.

9. In a steering column for a motor vehicle and including two steering shaft sections which have a common axis and which include end portions that are offset with respect to said common axis and that are in overlapping relation to each other, and a separable connecting device interconnecting said two end portions, the improvement wherein said connecting device comprises:
   two flanges of identical configuration, each said flange having fixed to and extending therefrom respective connecting pins and defining respective openings complementary to said pins;
   each said flange being fixed to a respective said end portion with said flanges being mounted symmetrically in such manner that said connecting pins of each of said flanges slidably extend through said openings of the other of said flanges; and
   sleeves of friction material interposed between said connecting pins fixed to each of said flanges and the respective said openings provided in the other of said flanges, said sleeves forming means to provide gripping to ensure controlled sliding between said connecting pins and said respective openings.

10. The improvement claimed in claim 9, wherein at least one of said offset end portions is inclined relative to said common axis, and said flanges are secured to said end portions in such manner as to be disposed obliquely relative to said common axis.

11. The improvement claimed in claim 9, wherein said sleeves are made from a rigid plastics material.

12. The improvement claimed in claim 9, wherein said sleeves are made from an elastomer.

13. The improvement claimed in claim 9, wherein at least one said end portion is bent so as to be parallel to the respective said shaft section of which it is part.

14. The improvement claimed in claim 9, wherein each said flange has extending therethrough a further opening in which is engaged the respective said end portion of the corresponding shaft section, and each said flange includes two lateral projecting portions which define therebetween a cavity for the passage of the said end portion to which the other said flange is secured.

15. The improvement claimed in claim 14, wherein said connecting pins of each said flange are each fixed to one of said lateral projecting portions of said each flange.

16. The improvement claimed in claim 9, wherein at least one of said flanges is mounted in an inclined position relative to the respective said end portion to which it is fixed.

17. A connecting device as claimed in claim 1, wherein said openings extend entirely through respective said flanges.

18. The improvement claimed in claim 9, wherein said openings extend entirely through respective said flanges.

* * * * *